(12) United States Patent
Brown et al.

(10) Patent No.: US 6,733,220 B2
(45) Date of Patent: May 11, 2004

(54) CARGO BAR

(75) Inventors: Raymond S. Brown, Modesto, CA (US); Ami Nadav Shapiro, West Hollywood, CA (US)

(73) Assignee: USA Products Group, Inc., Lodi, CA (US)

( * ) Notice: Subject to any disclaimer, the term of this patent is extended or adjusted under 35 U.S.C. 154(b) by 0 days.

(21) Appl. No.: 10/222,413

(22) Filed: Aug. 15, 2002

(65) Prior Publication Data

US 2004/0033117 A1 Feb. 19, 2004

(51) Int. Cl.[7] .................................................. B60P 7/15
(52) U.S. Cl. ........................ 410/151; 410/143; 410/145
(58) Field of Search ................................ 410/143, 145, 410/151; 248/354.6, 354.7; 211/105.3; 254/14, 108, 109; 74/142, 143, 152, 154, 158, 161

(56) References Cited

U.S. PATENT DOCUMENTS

| | | | | |
|---|---|---|---|---|
| 4,781,499 A | * | 11/1988 | Wisecarver | 410/151 |
| 5,769,580 A | * | 6/1998 | Purvis | 410/151 |
| 5,947,666 A | * | 9/1999 | Huang | 410/151 |
| 6,062,782 A | * | 5/2000 | Huang | 410/151 |
| 6,186,715 B1 | | 2/2001 | Oliviero | 410/151 |
| 6,210,090 B1 | * | 4/2001 | Wyse | 410/151 |
| 6,368,037 B1 | | 4/2002 | Oliviero et al. | 410/151 |
| 6,607,338 B2 | * | 8/2003 | Lemke | 410/151 |

\* cited by examiner

*Primary Examiner*—Stephen Gordon
(74) *Attorney, Agent, or Firm*—Gray Cary Ware & Freidenrich LLP

(57) ABSTRACT

A cargo bar including first and second bars extending from opposite sides of a grip housing, with distal ends thereof defining a cargo bar length. An advancement pawl moves the first bar away from the second bar to increase the cargo bar length. A holding pawl prevents the first bar from moving back toward the second bar to decrease the cargo bar length. First and second handles are rotatably attached to the housing between folded positions proximate to the housing and operating positions extending away from the housing. The first handle has an engagement portion that engages with and operates the advancement pawl as the first and second handles are squeezed together. The holding pawl includes a release tab that extends from the housing that when pressed, causes the holding pawl to release the first bar and allow it to move to decrease the cargo bar length.

20 Claims, 4 Drawing Sheets

CARGO BAR

FIELD OF THE INVENTION

The present invention relates to cargo restraint, and more particularly to cargo bars used to prevent cargo from shifting in truck bodies and trailers during transit.

BACKGROUND OF THE INVENTION

Various cargo restraint systems for restraining cargo loads in trucks and trailers are well known in the art. One such device is commonly known as a cargo bar, which typically includes a pair of telescoping bars with ends that bear against opposing truck walls (or opposing truck floor and ceiling) with sufficient tension to hold the cargo bar (and therefore any abutting cargo load) in place. Cargo bars are advantageous over other cargo restraining systems because no other mounting devices or tracks need be mounted to the truck walls. Thus, cargo bars can be quickly positioned and affixed between any opposing fixed surfaces, and later removed without any mounting devices or holes left behind.

Cargo bars usually employ a ratchet device to lengthen the bar and create the tension that wedges the cargo bar in place. The ratchet device includes teeth and/or engagement pawls to advance and hold one of the telescoping bars relative to the other (see for example U.S. Pat. Nos. 6,186,715 and 6,368,037). The ratchet is operated by reciprocating a lever to lengthen the bar and create the desired tension between the truck walls, and by moving the lever to a release position that releases the cargo bar's tension and allows the shortening of the bar's length.

Prior art cargo bars have several drawbacks. First, once the cargo bar is wedged in place, the lever is left either partially or fully protruding from the ratchet housing, which can be a hazard to any nearby people or cargo. Second, the lever often operates not only the tensioning of the cargo bar, but also the release of its tension, thus increasing the risk of operator error that could accidental release of the cargo bar tension. Moreover, anything or anyone accidentally bumping into a partially or filly protruding lever after the cargo bar is wedged in place may inadvertently release the cargo bar tension. Third, the cargo bar lever is operated in a reciprocating motion that is largely lateral to the length of the bar, meaning that the operator must hold the bar in place to counteract the lateral forces exerted on the bar while the lever is operated.

There is a need for a cargo bar design that is simple in design, easy to operate with a single hand, and does not employ a lever that protrudes from the ratchet mechanism after the cargo bar in wedged in place.

SUMMARY OF THE INVENTION

The present invention is a cargo bar that includes a housing, first and second bars extending from the housing in opposite directions with distal ends thereof defining a cargo bar length, an advancement pawl disposed in the housing for moving the first bar relative to the second bar to increase the cargo bar length, a holding pawl disposed in the housing for selectively holding the first bar to prevent movement thereof relative to the second bar that decreases the cargo bar length, and first and second handles extending from the housing. The first handle has an engagement portion that engages with and operates the advancement pawl as the first and second handles are squeezed together.

In another aspect of the present invention, a grip assembly for a rigid bar includes a housing through which a portion of the rigid bar extends, an advancement pawl disposed in the housing for moving the bar relative to the housing in a first direction, a holding pawl disposed in the housing for selectively holding the bar to prevent movement thereof relative to the housing in a second direction opposite the first direction, and first and second handles extending from the housing. The first handle has an engagement portion that engages with and operates the advancement pawl as the first and second handles are squeezed together.

In yet another aspect of the present invention, a cargo bar includes first and second bars having proximate ends that slide relative to each other in a telescopic manner, wherein distal ends of the first and second bars define a cargo bar length, a housing disposed at an intersection between the first and second bars, wherein the second bar is affixed to the housing and the first bar slides through the housing and inside the second bar, an advancement pawl disposed in the housing for moving the first bar relative to the second bar in a first direction that increases the cargo bar length, a holding pawl disposed in the housing for selectively holding the first bar to prevent movement thereof relative to the second bar in a second direction that decreases the cargo bar length, and first and second handles extending from the housing. The first handle has an engagement portion that engages with and operates the advancement pawl as the first and second handles are squeezed together.

Other objects and features of the present invention will become apparent by a review of the specification, claims and appended figures.

DETAILED DESCRIPTION OF THE PREFERRED EMBODIMENTS

Figure 1A:
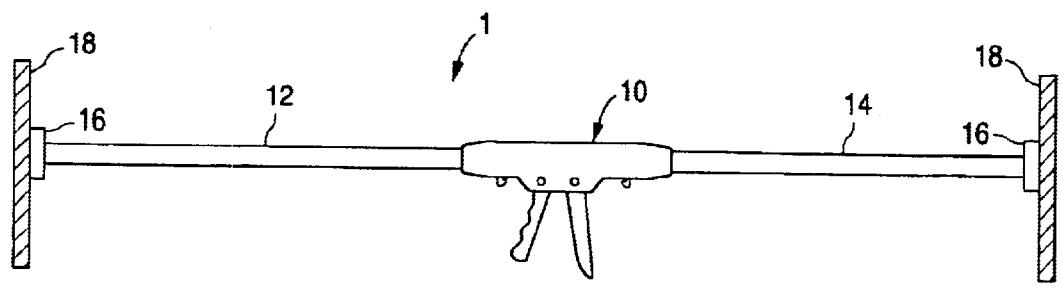
FIG. 1A is a side view of the cargo bar of the present invention, in its open operating position.
Figure 1B:
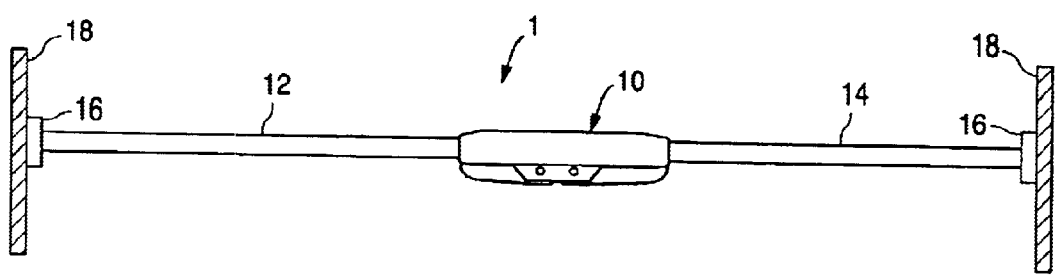
FIG. 1B is a side view of the cargo bar of the present invention, in its folded closed position.

The present invention is a cargo bar 1, as shown in FIGS. 1A and 1B, that includes a grip assembly 10, an inner (first) bar 12, and an outer (second) bar 14. The proximate ends of the bars 12/14 overlap in a telescopic manner. The outer distal ends of bars 12/14 define the cargo bar's overall length, and engage opposing fixed surfaces 18 (e.g. truck walls). Preferably, pads 16 are attached to the distal ends of bars 12/14 to provide an enlarged gripping surface area. Pads 16 can be rigidly attached to bar distal ends, or movably mounted (e.g. hinged, gimbal mounted, etc.) so that the pads 16 can grip fixed surfaces that are not perfectly orthogonal to the bars 12/14.

Figure 2A:
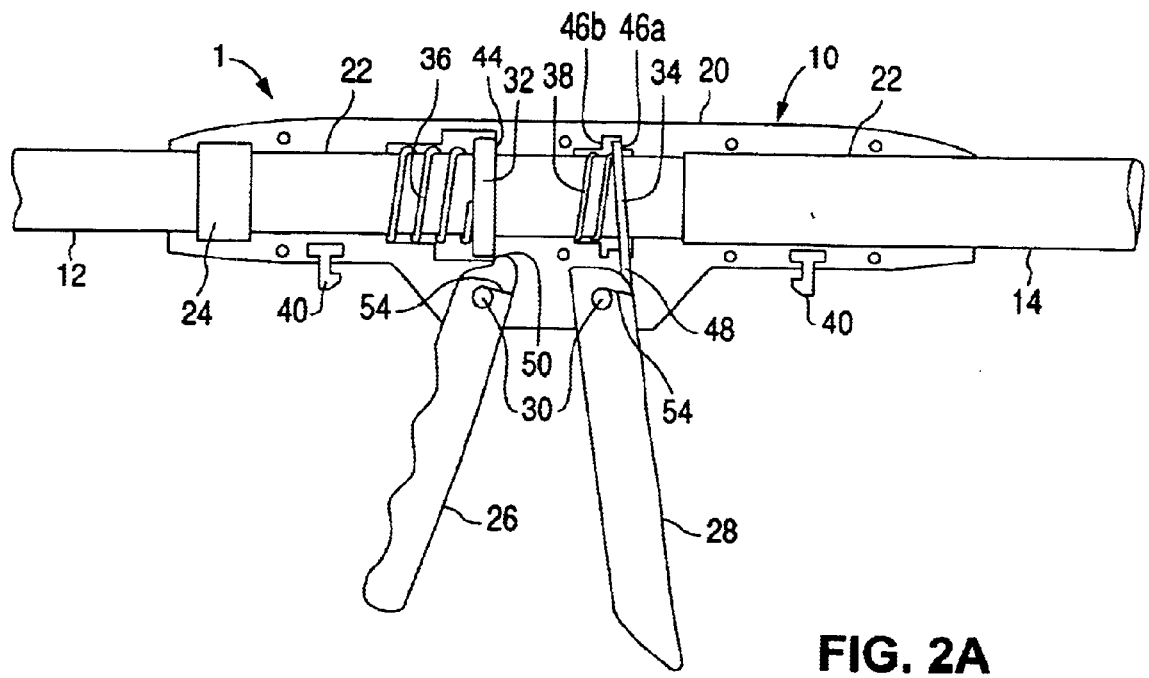
FIG. 2A is a side view of the inside of the grip assembly of the present invention.
Figure 2B:
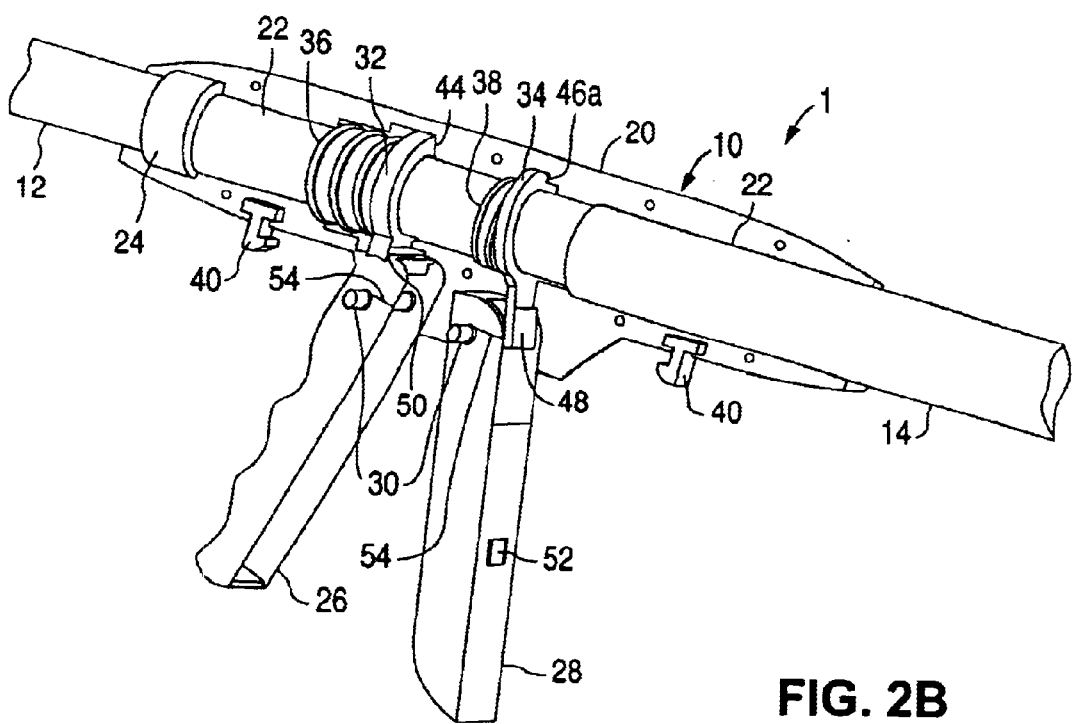
FIG. 2B is a perspective view of the inside of the grip assembly of the present invention.

The grip assembly 10 is better shown in FIGS. 2A and 2B, and includes a housing 20 having a central bore 22 formed therethrough, an optional support ring 24 disposed around inner bar 12, a pair of handles 26/28 pivotally attached to the housing via pins or bolts 30, a pair of pawls 32/34 both disposed around inner bar 12, a pair of pawl springs 36/38, and a pair of handle clips 40.

The housing 20 is disposed around the junction between the inner and outer bars 12/14. The proximal end of outer bar 14 terminates in housing bore 22, and is securely affixed to the housing 20. Bar 12 has an outer diameter that is smaller than the inner diameter of bar 14, so that the proximal end of inner bar 12 extends through housing bore 22 and inside of outer bar 14 in a sliding telescopic manner. Optional ring 24 is preferably made of a low friction material and is disposed in housing bore 22 and around inner bar 12 to provide a smooth surface for inner bar 12 to slide through. The overall length of the cargo bar 1 is increased and decreased by sliding the inner bar 12 further out of and into outer bar 14.

The sliding position of inner bar 12 relative to housing 20 and outer bar 14 is controlled by the pair of (advancement/holding) pawls 32/34, which are disposed in the housing bore 22. Each of the pawls 32/34 is a washer-shaped member having an opening through which inner bar 12 is inserted, with a diameter that is slightly larger than the outer diameter of the inner bar 12. Thus, when the pawls 32/34 are aligned square (i.e. perpendicular) to the inner bar 12, the inner bar 12 can easily slide through the pawls. However, when either of the pawls 32/34 becomes skewed to the inner bar 12, it grips the bar and prevents it from sliding therethrough.

Housing bore 22 includes an annular shoulder 44 that is oriented orthogonally to the surface of inner bar 12. Pawl spring 36 resiliently urges advancement pawl 32 into a flat position against annular shoulder 44, which maintains advancement pawl 32 in a position square to the inner bar 12. Housing bore 22 also includes a pair of projections 46a/46b (e.g. opposing sidewalls of a slot) which engage only the top portion of holding pawl 34. Pawl spring 38 resiliently urges holding pawl 34 toward the outer bar 14, where the upper portion of holding pawl 34 is held against projection 46a, and the lower portion of holding pawl 34 is urged beyond projection 46a which skews the holding pawl 34 relative to the inner bar 12. In this skewed position, the holding pawl 34 grips inner bar 12 and prevents it from sliding toward outer bar 14. The greater the tension on inner bar 12 toward outer bar 14, the greater the gripping power of the holding pawl 34.

Figure 4:
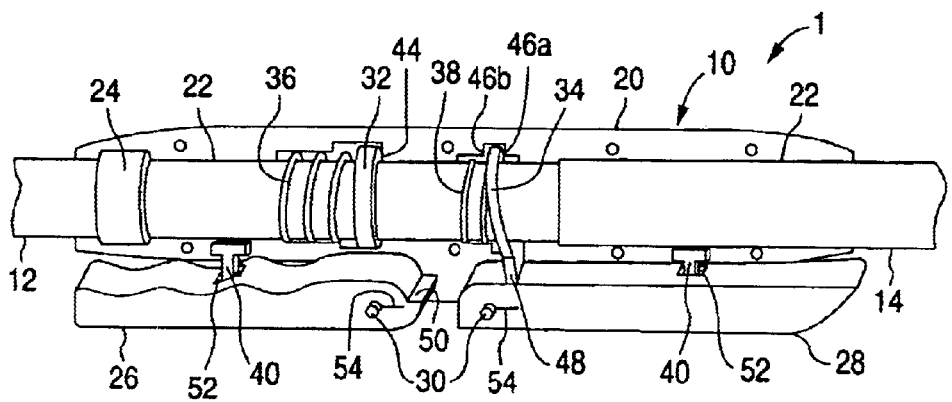
FIG. 4 is a side view of the inside of the grip assembly of the present invention, with the handles folded into their closed positions.

Advancement and reference handles 26/28 pivot about pins or bolts 30 between operating positions shown in FIGS. 1A, 2A and 2B, and closed (folded) positions shown in FIGS. 1B and 4. Advancement handle 26 is disposed underneath advancement pawl 32, and reference handle 28 is disposed under the holding pawl 34. The housing itself and/or any other rigid member(s) attached thereto engage with reference handle 28 and prevent it from rotating beyond its operating position (i.e. toward advancement handle 26). Advancement handle 26 includes an engagement tab 50 that engages with the bottom portion of advancement pawl 32 when advancement handle 26 is positioned in its operating position. Both handles 26/28 include apertures 52 that engage with clips 40 to secure the handles 26/28 in place when in their closed (folded) positions.

Figure 3:
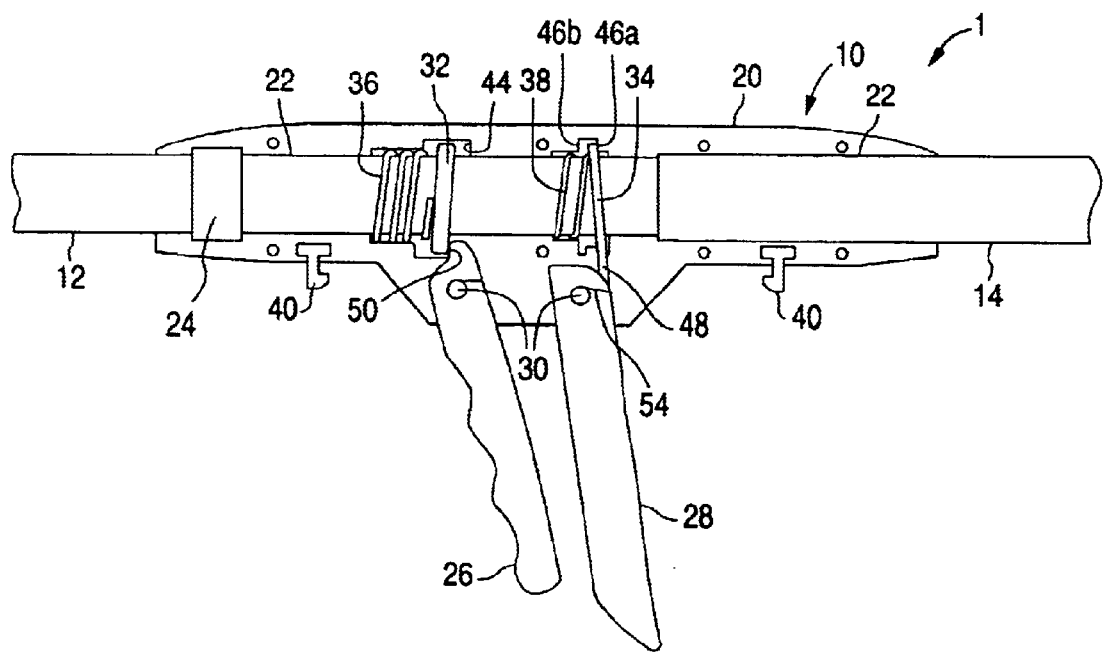
FIG. 3 is a side view of the inside of the grip assembly of the present invention, with the advancement handle squeezed toward the reference handle.

To lengthen the cargo bar 1, the operator positions the handles 26/28 in their operating positions (see FIG. 2A), and then squeezes them together, as shown in FIG. 3. This squeezing action rotates advancement handle 26 beyond its operating position so that its engagement tab 50 pushes against and moves the bottom of advancement pawl 32 (against the bias of spring 36). The movement of the bottom of advancement pawl 32 skews its position relative to inner bar 12, causing advancement pawl 32 to grip and move inner bar 12 away from outer bar 14 (i.e. increasing the length of cargo bar 1). During this movement of inner bar 12, holding pawl 34 loses its grip on, and slides along, inner bar 12 (either by the force of spring 38 against the upper portion of holding pawl which is no longer supported by protrusion 46a, or when inner bar 12 moves far enough so upper portion of holding pawl 34 engages with protrusion 46b). Once the movement of inner bar 12 ceases, holding pawl 34 is urged back into its skewed position around inner bar 12 and against protrusion 46a by spring 38, where holding pawl 34 grips and prevents movement of inner bar 12 back toward outer bar 14. Once the operator releases advancement handle 26, it returns back to its operating position, and advancement pawl 32 is urged by spring 36 back against shoulder 44. By repeatedly squeezing and releasing handles 26/28 in a reciprocating fashion, the length of the cargo bar 1 is increased until the distal ends thereof engage the opposing fixed surfaces 18 with the desired tension. Thereafter, the tension is maintained by holding pawl 34, and handles 26/28 can be rotated to their closed (folded) positions against housing 20 and locked in place by locking tabs 40, as shown in FIGS. 1B and 4.

To release the cargo bar tension and shorten its length, the operator rotates the reference handle 28 to its operating position, which exposes release tab 48. Optional springs 54 can be mounted around pins/bolts 30 to resiliently urge handles 26/28 to their operating positions once released from locking tabs 40. The operator then presses on release tab 48 (e.g. with the operator's thumb while gripping the reference handle 28), which moves the bottom portion of holding pawl 48 to square its orientation relative to inner bar 12, thus releasing its grip thereon. Thus, with neither of the pawls 32/34 gripping inner bar 12, it can slide back into outer bar 14 to release the tension and shorten the overall length of the cargo bar 1. Inadvertent engagement of release tab 48 is prohibited while reference handle 28 is in its folded position, where it covers release tab 48.

The cargo bar 1 of the present invention allows an operator to conveniently lengthen the cargo bar with a single hand, without any unopposed lateral forces on the cargo bar. The handles then fold away so that the grip assembly 10 has a ergonomic, streamlined shape with no protruding handles or levers that could pose a hazard or cause accidental release of the cargo bar tension.

Figure 5A:
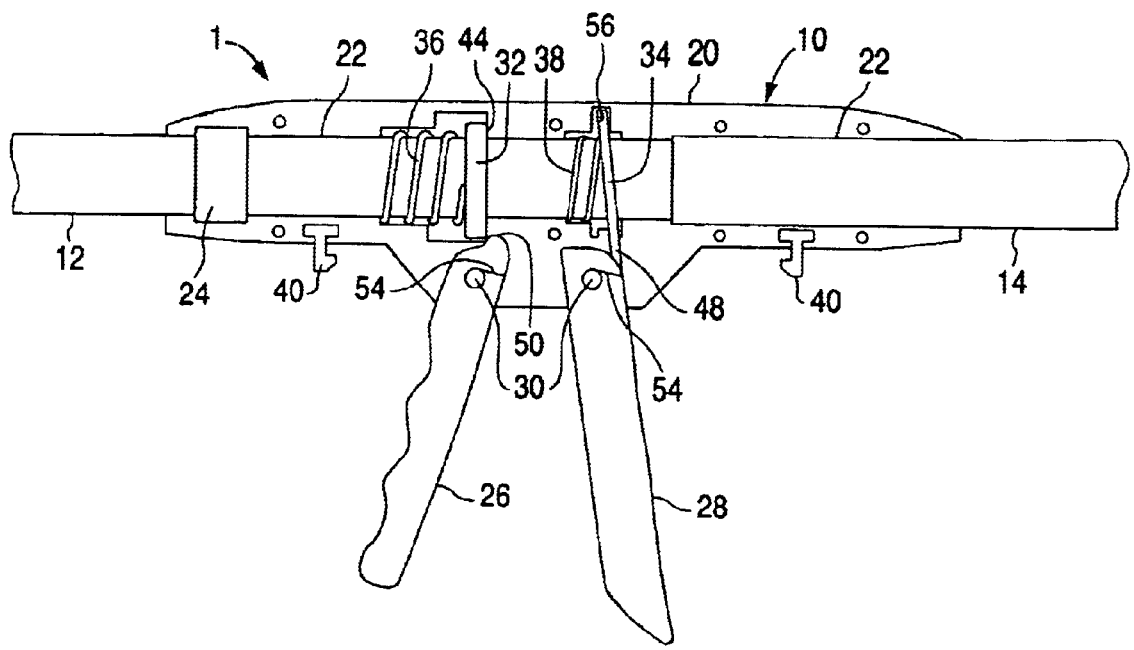
FIG. 5A is a side view of the inside of the grip assembly of the present invention, with the top portion of holding pawl hingedly attached to the housing.
Figure 5B:
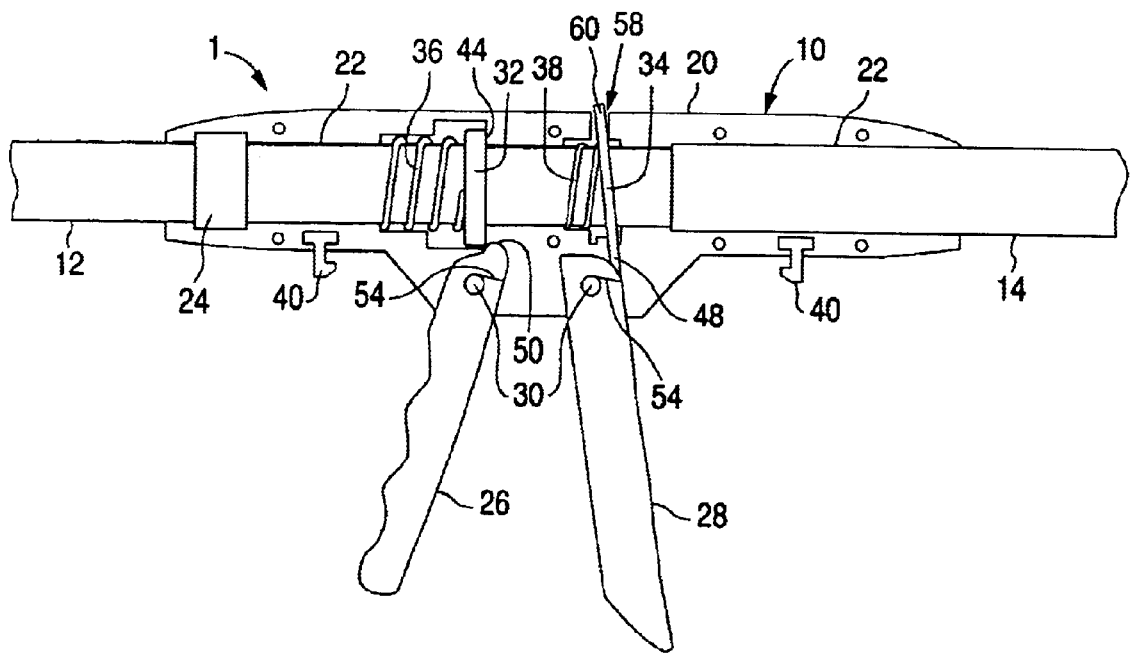
FIG. 5B is a side view of the inside of the grip assembly of the present invention, with the top portion of holding pawl including a tab that engages with a slot formed in the housing.

It is to be understood that the present invention is not limited to the embodiment(s) described above and illustrated herein, but encompasses any and all variations falling within the scope of the appended claims. For example, teeth (not shown) could be added to the inner bar 12 to better allow pawls 32/34 to engage therewith. Additionally, release tab 48 could be replaced with a separate button or lever that pushes on holding pawl 34. Annular shoulder 44 need not form a continuous annular surface upon which pawl 32 make contact. As used herein, shoulder 44 can be any single or multi-part surface or protrusion that defines a plane at which pawl 32 is positioned. The present invention is not limited for use with trucks or even with cargo, but can be used for any application where a rigid bar is needed between two fixed surfaces. Furthermore, for those applications not requiring a significant amount of adjustment in overall cargo bar length (e.g. less than the length of the housing 20), the inner/outer bars need not be telescopically oriented, and in fact the outer bar 14 could be eliminated in favor of allowing the housing 20 or an extremity thereof to directly engage with one of the rigid surfaces. The upper portion of holding pawl 34 need not float between shoulders 46a/46b to skew its position, but instead could be engaged with the housing using a hinge 56 (as shown in FIG. 5A) or a slot/hole 58 in the housing through which a tab or pin 60 from the holding pawl 34 extends (as shown in FIG. 5B) in order to pivot and skew the holding pawl 34 relative to inner bar 12. While inner/outer bars 12/14 are shown with a round cross-section, as used herein, bars 12/14 are any elongated rigid members having any appropriate cross-sectional shape (e.g. triangular, oval, square, etc.). Likewise, while pawls 32/34 are shown as having a closed, round aperture through which inner bar 12 extends, as used herein, pawls 32/34 are any rigid members having an open or closed aperture (e.g. washer shaped defining closed aperture, U-shaped defining an open slot shaped aperture, etc.) with opposing surfaces thereof that grip the inner bar 12 when the effective spacing therebetween is reduced as the pawls 32/34 become skewed relative to the inner bar 12.

What is claimed is:

1. A cargo bar, comprising:
   a housing;
   first and second bars extending from the housing in opposite directions with distal ends thereof defining a cargo bar length;
   an advancement pawl disposed in the housing for moving the first bar relative to the second bar to increase the cargo bar length;
   a holding pawl disposed in the housing for selectively holding the first bar to prevent movement thereof relative to the second bar that decreases the cargo bar length; and
   first and second handles extending from the housing, wherein the first handle has an engagement portion that engages with and operates the advancement pawl as the first and second handles are squeezed together.

2. The cargo bar of claim 1, wherein the first and second handles are rotatably attached to the housing from a folded position proximate to the housing to an operating position extending away from the housing, and wherein the first handle engagement portion engages with and operates the advancement pawl as the first handle is rotated toward the second handle and beyond the operating position thereof.

3. The cargo bar of claim 2, wherein the holding pawl includes a release tab that extends from the housing, and wherein as the release tab is pressed, the hold on the first bar by the holding pawl is released for allowing the first bar to move relative to the second bar to decrease the cargo bar length.

4. The cargo bar of claim 3, wherein the second handle covers the release tab in the folded position thereof and exposes the release tab in the operating position thereof.

5. The cargo bar of claim 2, further comprising:
   a first clip for engaging with and securing the first handle in the folded position thereof; and
   a second clip for engaging with and securing the second handle in the folded position thereof.

6. The cargo bar of claim 3, wherein the first bar moves telescopically, with respect to the second bar.

7. The cargo bar of claim 6, wherein the housing includes a bore in which a portion of the second bar is affixed to the housing and through which the first bar slides.

8. The cargo bar of claim 7, wherein the advancement and holding pawls are disposed in the bore and each have an opening through which the first bar extends, and wherein the advancement and holding pawls each grip the first bar as an alignment thereof with the first bar becomes skewed.

9. The cargo bar of claim 8, further comprising:
   an annular shoulder formed in the bore and defining a plane substantially perpendicular to the first bar;
   a first spring urging the advancement pawl against the annular shoulder;
   a protrusion formed in the bore;
   a second spring urging a first portion of the holding pawl against the protrusion and urging a second portion of the holding pawl beyond the protrusion for skewing the holding pawl relative to the first bar;
   wherein as the first handle is rotated beyond the operating position thereof, the first handle engagement portion pushes on and skews the advancement pawl relative to the first bar so that the advancement pawl grips and slides the first bar relative to the second bar; and
   wherein as the release tab is depressed, the skew of the holding pawl relative to the first bar is reduced or eliminated to release the grip therebetween.

10. The cargo bar of claim 8, wherein the holding pawl is rotatably engaged with the housing via a tab portion thereof or a hinge.

11. The cargo bar of claim 1, further comprising:
    a ring disposed in the housing and around the first bar for providing a smooth surface for the first bar to slide through.

12. A cargo bar, comprising:
    first and second bars having proximate ends that slide relative to each other in a telescopic manner, wherein distal ends of the first and second bars define a cargo bar length;
    a housing disposed at an intersection between the first and second bars, wherein the second bar is affixed to the housing and the first bar slides through the housing and inside the second bar;
    an advancement pawl disposed in the housing for moving the first bar relative to the second bar in a first direction that increases the cargo bar length;
    a holding pawl disposed in the housing for selectively holding the first bar to prevent movement thereof relative to the second bar in a second direction that decreases the cargo bar length; and
    first and second handles extending from the housing, wherein the first handle has an engagement portion that engages with and operates the advancement pawl as the first and second handles are squeezed together.

13. The cargo bar of claim 12, wherein the first and second handles are rotatably attached to the housing from a folded position proximate to the housing to an operating position extending away from the housing, and wherein the first handle engagement portion engages with and operates the advancement pawl as the first handle is rotated toward the second handle and beyond the operating position thereof.

14. The cargo bar of claim 13, wherein the holding pawl includes a release tab that extends from the housing, and wherein as the release tab is pressed, the hold on the first bar by the holding pawl is released for allowing the first bar to move in the second direction.

15. The cargo bar of claim 14, wherein the second handle covers the release tab in the folded position thereof and exposes the release tab in the operating position thereof.

16. The cargo bar of claim 13, further comprising:
a first clip for engaging with and securing the first handle in the folded position thereof; and
a second clip for engaging with and securing the second handle in the folded position thereof.

17. The cargo bar of claim 14, wherein the advancement and holding pawls each have an opening through which the first bar extends, and wherein the advancement and holding pawls each grip the first bar as an alignment thereof with the first bar becomes skewed.

18. The cargo bar of claim 17, further comprising:
an annular shoulder formed in the housing and defining a plane substantially perpendicular to the first bar;
a first spring urging the advancement pawl against the annular shoulder;
a protrusion formed in the housing;
a second spring urging a first portion of the holding pawl against the protrusion and urging a second portion of the holding pawl beyond the protrusion for skewing the holding pawl relative to the first bar;
wherein as the first handle is rotated beyond the operating position thereof, the first handle engagement portion pushes on and skews the advancement pawl relative to the first bar so that the advancement pawl grips and slides the first bar in the first direction; and
wherein as the release tab is depressed, the skew of the holding pawl relative to the first bar is reduced or eliminated to release the grip therebetween.

19. The cargo bar of claim 17, wherein the holding pawl is rotatably engaged with the housing via a tab portion thereof or a hinge.

20. The cargo bar of claim 12, further comprising:
a ring disposed in the housing and around the first bar for providing a smooth surface for the first bar to slide through.

* * * * *